United States Patent [19]

Anderson et al.

[11] 3,745,260

[45] July 10, 1973

[54] TELEPHONE SWITCHING SYSTEM WITH LINE HUNTING

[75] Inventors: Charles Andrew Anderson; John Mason Catterall, both of Columbus, Ohio; Richard Maurice Swanson, Holmdel, N.J.

[73] Assignees: Bell Telephone Laboratories, Incorporated, Murray Hill, N.J. ; by said Catterall and Swanson; Western Electric Company, New York, N.Y. ; by said Anderson

[22] Filed: Mar. 20, 1972

[21] Appl. No.: 236,485

[52] U.S. Cl. .......... 179/18 HA

[51] Int. Cl. .......... H04q 3/62

[58] Field of Search .......... 179/18 HA, 18 ET

[56] References Cited

UNITED STATES PATENTS

| | | | |
|---|---|---|---|
| 3,519,755 | 7/1970 | Allum et al. | 179/18 HA |
| 3,670,109 | 6/1972 | Leyburn et al. | 179/18 ET |
| 3,626,378 | 12/1971 | Salle et al. | 340/172.5 |
| 3,278,692 | 10/1966 | Bean et al. | 179/18 HA |
| 3,701,853 | 10/1972 | Duval et al. | 179/18 HA |

*Primary Examiner*—Thomas W. Brown
*Attorney*—W. L. Keefauver et al.

[57] ABSTRACT

A common control telephone switching system featuring line hunting is disclosed. Using the dialed number, a marker circuit interrogates a number group translator to ascertain the line equipment location of the called line. The line location received from the number group is registered in the marker for use in selecting the called line. The marker also receives an indication as to how many lines are in the hunting group and how the marker can generate the line locations for the other lines in the group. In the specific embodiment, if the called line is unavailable, the output of the line location register is altered to permit the selection of another line in the hunting group without resorting to additional number group translations.

13 Claims, 7 Drawing Figures

TELEPHONE SWITCHING SYSTEM WITH LINE HUNTING

FIELD OF THE INVENTION

Although once a luxury, a telephone is now considered by many to be a necessary vehicle of communication. In fact, there are increasing circumstances where one telephone line is insufficient to fill the needs of an individual customer. In those situations where a plurality of telephone lines serve the same customer, it is desirable to provide a so-called "line hunting" feature, whereby calls are automatically directed to an idle line if the called line is busy or otherwise unavailable.

BACKGROUND OF THE INVENTION

In the earlier direct progressive type switching systems, such as step-by-step, there was a direct correspondence between the directory number and the called line equipment location. Step-by-step systems employed rotary switches which would automatically seek out the first idle line in the group by testing each line terminal in succession. These systems, however, had certain limitations. For example, the telephone numbers assigned to the lines in the group had to be consecutive and hunting was generally unidirectional, that is to say, the switches could advance from the lowest to the highest numbered line in the group, but not vice versa.

With the introduction of common control type switching systems there was a complete disassociation of telephone numbers from line equipment locations. This permitted the flexible assignment of any telephone number to any line equipment location but introduced the need for a translator to convert the dialed number into a line equipment location.

One such telephone system is shown in the U.S. Pat. No. 2,585,904 to A. J. Busch of Feb. 19, 1952. That system employs a number group circuit for translating the listed directory number into a line equipment location number and the sleeve leads for all lines requiring hunting are extended to the number group. When the called directory number is presented to the number group by a marker circuit, the sleeve leads of all lines in the same group as the called number are examined to find an idle line. The directory number associated with the selected idle line is then translated by the number group to ascertain the line equipment location of the idle line, and the marker seizes control of that line equipment to perform a second busy test before establishing a connection to the line.

While the Busch arrangement is suitable for larger hunting groups, the recent increase in the number of small hunting groups has lead to a demand for a less expensive and more efficient arrangement, particularly an arrangement which does not require the extension of all sleeve leads from the line equipment to the number group circuit.

One such arrangement has been proposed wherein the digits representing the called number are presented to the number group for translation. The number group translates the digits into the line equipment location of the dialed directory number and also furnishes another "units" digit associated with a second line in the hunting group. Using the line equipment number from the number group, the marker then attempts to complete a call, and if the line is found busy, the marker recycles and substitutes the units digit received from the number group for the dialed units digit. A second translation is now performed using the new units digit and the marker attempts to complete the call to the new line equipment number furnished by the number group.

While this hunting arrangement has been favorably used in small hunting groups it has certain obvious disadvantages. First, since the system merely substitutes a new units digit for the originally dialed digit, the telephone numbers assigned to all lines in the hunting group must have identical thousands, hundreds, and tens digits. Secondly, the marker has to initiate a second translation of the new directory number, thus increasing marker and number group holding time.

Accordingly, it is one object of this invention to provide a flexible and efficient line hunting arrangement for small line hunting groups.

Another object of this invention is to provide a line hunting arrangement which minimizes the need for additional directory number translations.

SUMMARY OF THE INVENTION

These and other objects are attained in the one illustrative embodiment of the invention wherein a number group circuit is used to translate a called directory number into its line equipment location and an indication of the line location of other lines in the line hunting group.

More specifically, a marker presents the originally called number to the number group for translation. The number group translator converts the called number into the corresponding line equipment location number and this line equipment location number is stored in a register in the marker. The number group also informs the marker of how many lines are in the group and how the marker can generate new line location information in the event that the call must be completed to another line in the hunting group. Using the line equipment location number associated with the originally called line, the marker seizes the line link frame on which the called line is located and tests the line for busy. If the line is available, the marker completes the desired connection to the line. If the originally called line is unavailable, the marker uses the indication from the number group to change the output of the line equipment location register in order to select the line equipment location of another line in the hunting group.

In the disclosed exemplary embodiment of the invention the line equipment location is defined in terms of its line link frame, vertical group, horizontal group, and vertical file designations and it has been found advantageous to change only the output of the horizontal group register in order to identify another line in the hunting group. Since the new line location is within the same line link frame equipment group, the marker can retain control over the originally seized line link frame and test the second line for busy before completing the desired connection.

It should be noted that with the proposed arrangement, there is no limitation on the assignment of telephone numbers to the lines in the hunting group and hunting in the group is independent of the directory number. Furthemore, once the marker has used the number group translator for translating the originally called number, the marker can find line equipment location of other lines in the group without further assistance from the translator.

BRIEF DESCRIPTION OF THE DRAWING

A further understanding of the arrangement contemplated will be had with the following description made with respect to the drawings in which.

BRIEF DESCRIPTION OF OPERATION

Figures 1, 7:
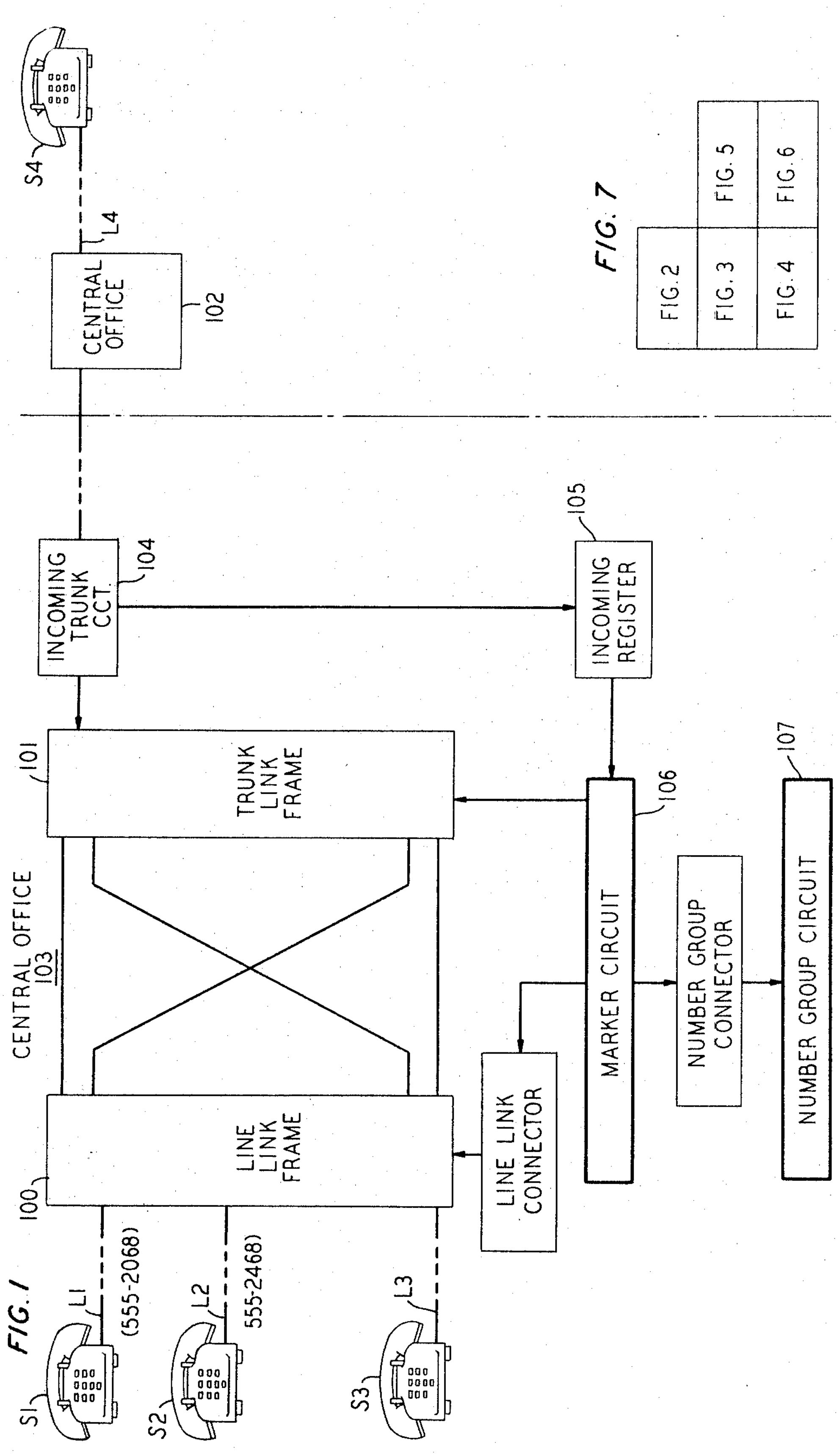
FIG. 1 is a block diagram showing the relationship of the components of a typical telephone switching system employing the invention.
FIG. 7 shows the arrangements of FIGS. 2–6.

The present invention may be advantageously employed in automatic switching systems such as the crossbar system disclosed in the above-identified Busch patent. However, it is to be understood that the invention is not limited to use in that system but may be used in many other types of switching systems.

The overall operation of the invention in the exemplary telephone system will now be described with respect to FIG. 1.

As set forth in greater detail in the Busch patent, the telephone system comprises a plurality of line link frames such as 100, on which subscriber lines are terminated and a plurality of trunk link frames, such as 101, on which many different types of trunks appear. Only three subscriber lines, L1, L2, and L3 have been shown in the drawing and it will be assumed that stations S1 and S2, served by lines L1 and L2, are in the same line hunting group. In other words, stations S1 and S2 serve the same customer and that customer desires that his calls will automatically be terminated to his other line if the dialed line is unavailable. Let it also be assumed that the listed directory numbers for stations S1 and S2 are 555-2068 and 555-2468, respectively.

The switching system also comprises a plurality of markers, such as 106, which direct the establishment of connections between the lines and trunks and also a plurality of number group circuits, such as 107, which are used to translate directory numbers into line equipment location designations on the line link frames. The system also comprises other units of common control equipment that have not been shown in the drawing since they form no part of the present invention.

If a customer at station S4, served by central office 102, wishes to call the customer served by stations S1 and S2, he dials either one of the directory numbers, such as 555-2068. The equipment at central office 102 uses the office code 555 to select a trunk, such as 104 to central office 103 and the four digits 2068, which represent the called line, are outpulsed over the trunk into an incoming register, such as 105. Once sufficient digits have been received by incoming register 105, register 105 selects an idle marker circuit 106. Register 105 forwards the identity of the incoming trunk 104 and the called telephone number 2068 to the marker. Marker 106 now proceeds to establish a connection to the trunk link frame on which trunk 104 appears, and through the use of number group circuit 107, the called number is translated into the appropriate line equipment location number.

In this particular system each subscriber line is associated with a line hold magnet on a line switch of a line link frame. For identification purposes, the line hold magnets on each line link frame are arranged in equipment groups called vertical groups, horizontal groups, and vertical files. A vertical file comprises a column of 10 line hold magnets having one hold magnet in each horizontal group of switches. Five adjacent vertical files make up an equipment unit called a vertical group and the number of vertical groups on the particular line link frame depends on the traffic capacity of the frame. Thus, by signifying the line link frame, vertical group, horizontal group, and vertical file identities, one can select any particular line in the office.

To convert a dialed number into a line equipment location number, a number group circuit is used. As shown in the Busch system, each number group circuit has capacity for translating 1,000 numbers. Accordingly, marker 106 seizes the appropriate number group using the thousands digit 2 and forwards the hundreds, tens, and unitS digits 068 to the number group. Number group 107 performs this translation and returns to the marker the line equipment location information pertaining to station S1.

In accordance with the teachings of our invention, number group 107 also informs the marker that the called line is in a two-line hunting group and by altering its line equipment location register, it can obtain the line equipment location associated with station S2, the other line in the hunting group.

Marker 106 releases number group 107 making it available to other markers, and marker 106 seizes line link frame 100 on which line L1 is located. Having seized control of line link frame 100, marker 106 extends a plurality of control leads to the line link frame and actuates the appropriate vertical group, horizontal group, and vertical file selection relays to give the marker access to line L1. Marker 106 now tests the line for busy and if the line is idle, marker 106 will establish a talking connection over the line and trunk frames to incoming trunk 104. If line L1 is busy, however, marker 106 will retain control of the line link frame and by using the information received from the number group 107, will decrement the output horizontal group register in the marker by the appropriate amount to ascertain the horizontal group location of the second line L2. Using the new line equipment location, marker 106 tests the second line for busy and completes the call accordingly.

If the number originally dialed had been 555-2468, number group circuit 107 would have furnished marker 106 with the line equipment location corresponding to line L2 and an indication that the horizontal group identity must be incremented should marker 106 find line L2 busy and wish to complete the call to line L1.

DETAILED DESCRIPTION

Figure 2:
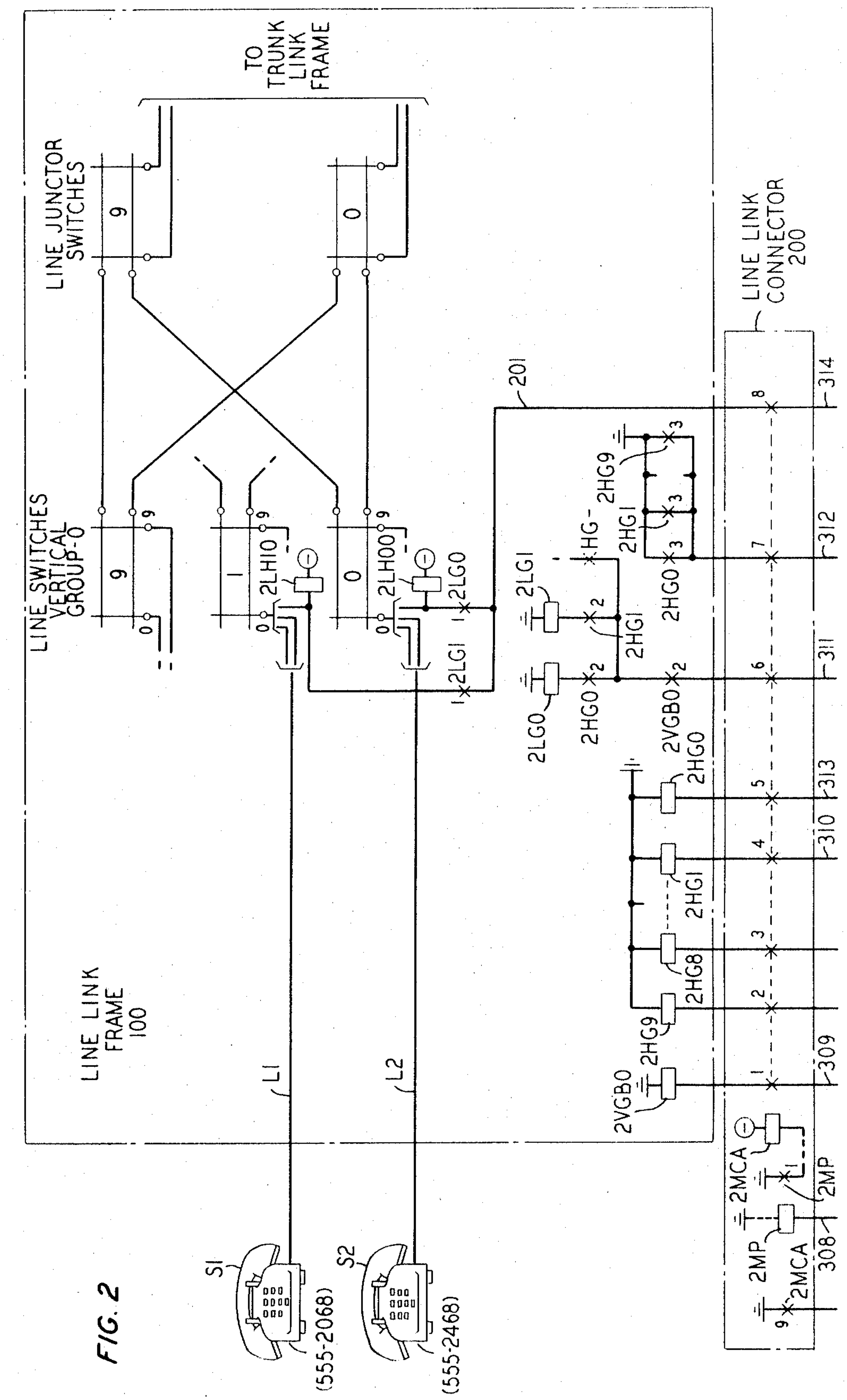
FIGS. 2–6 are schematic diagrams showing in greater detail the circuitry of certain equipment units depicted in FIG. 1.
Figure 3:
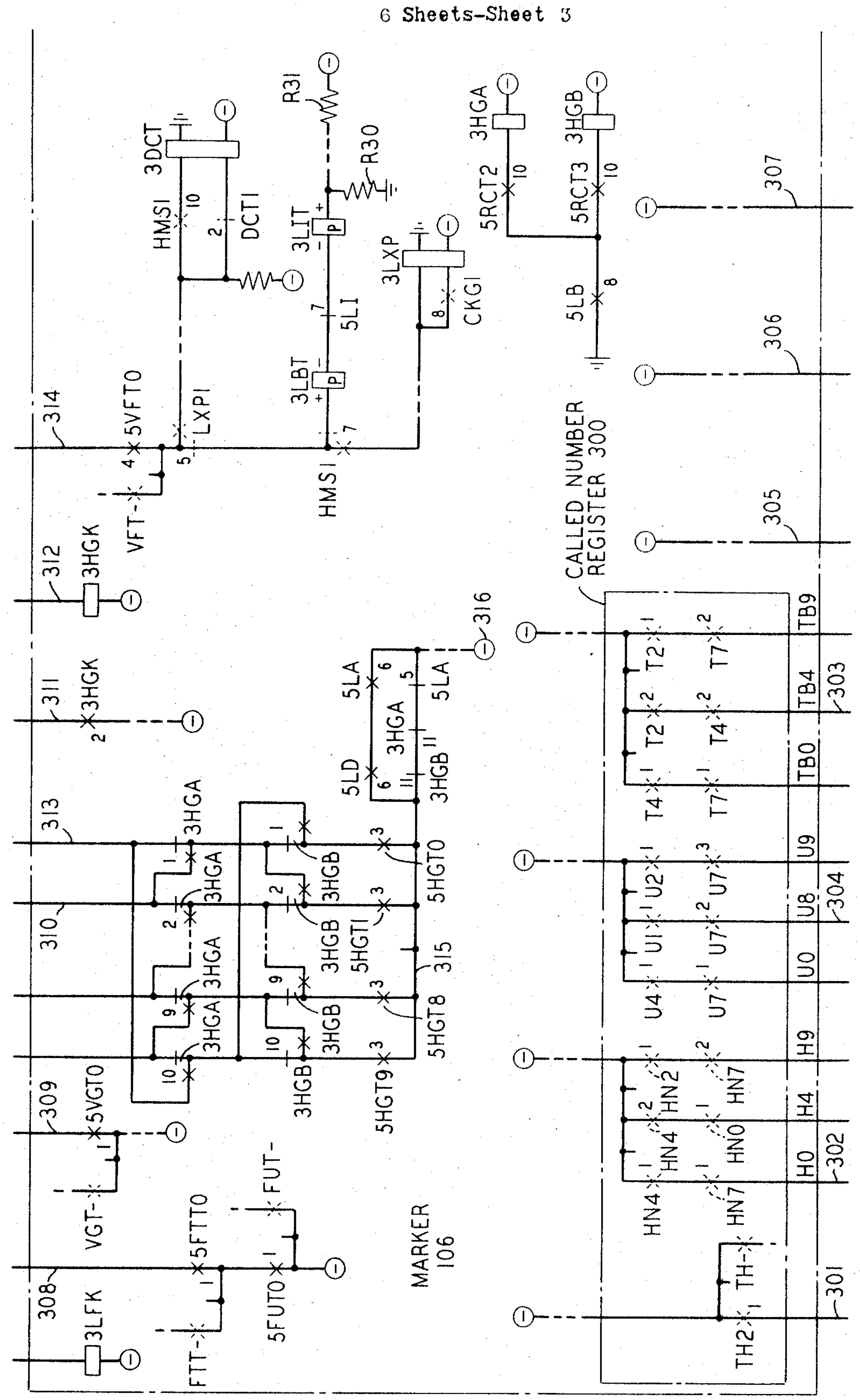
Figure 4:
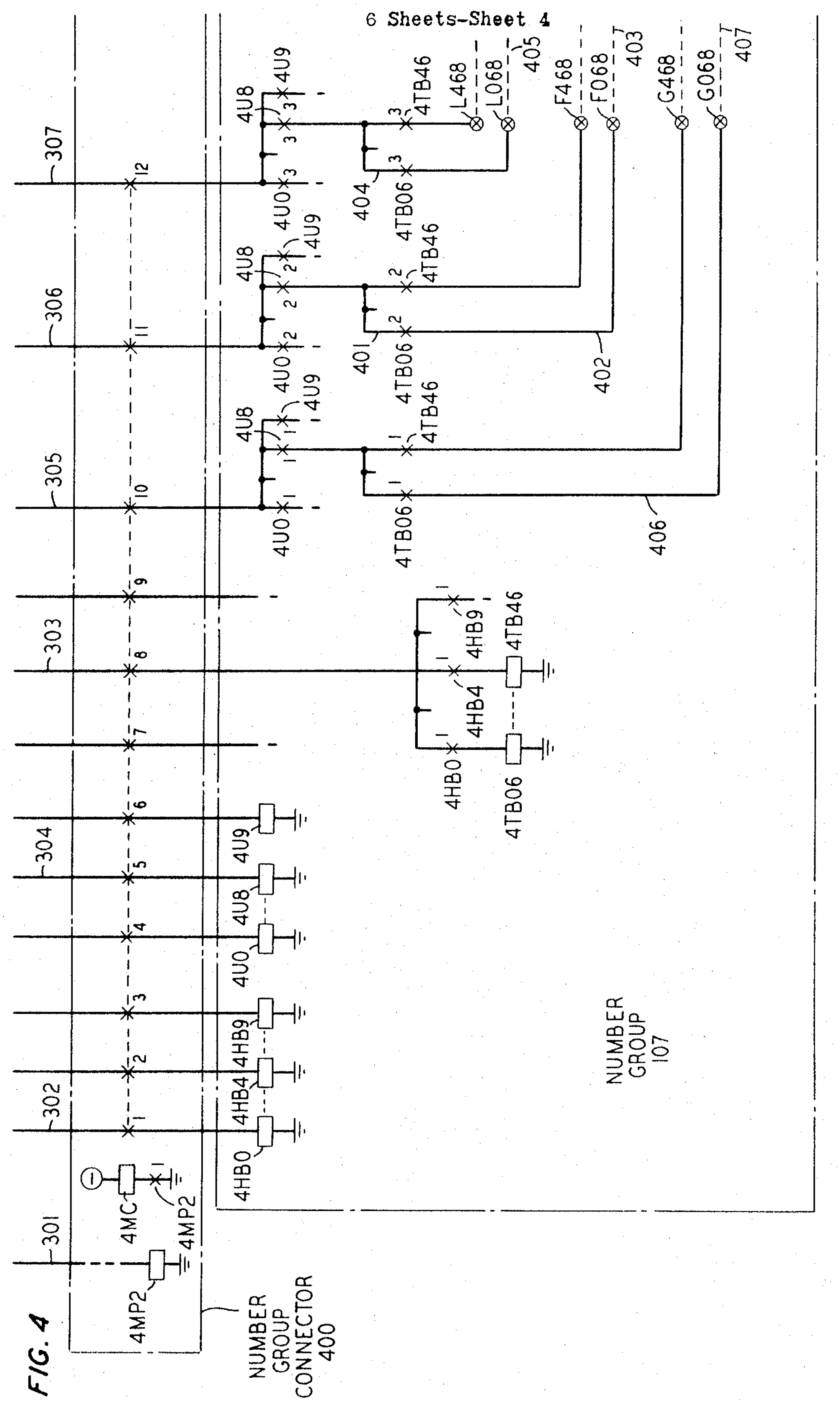
Figure 5:
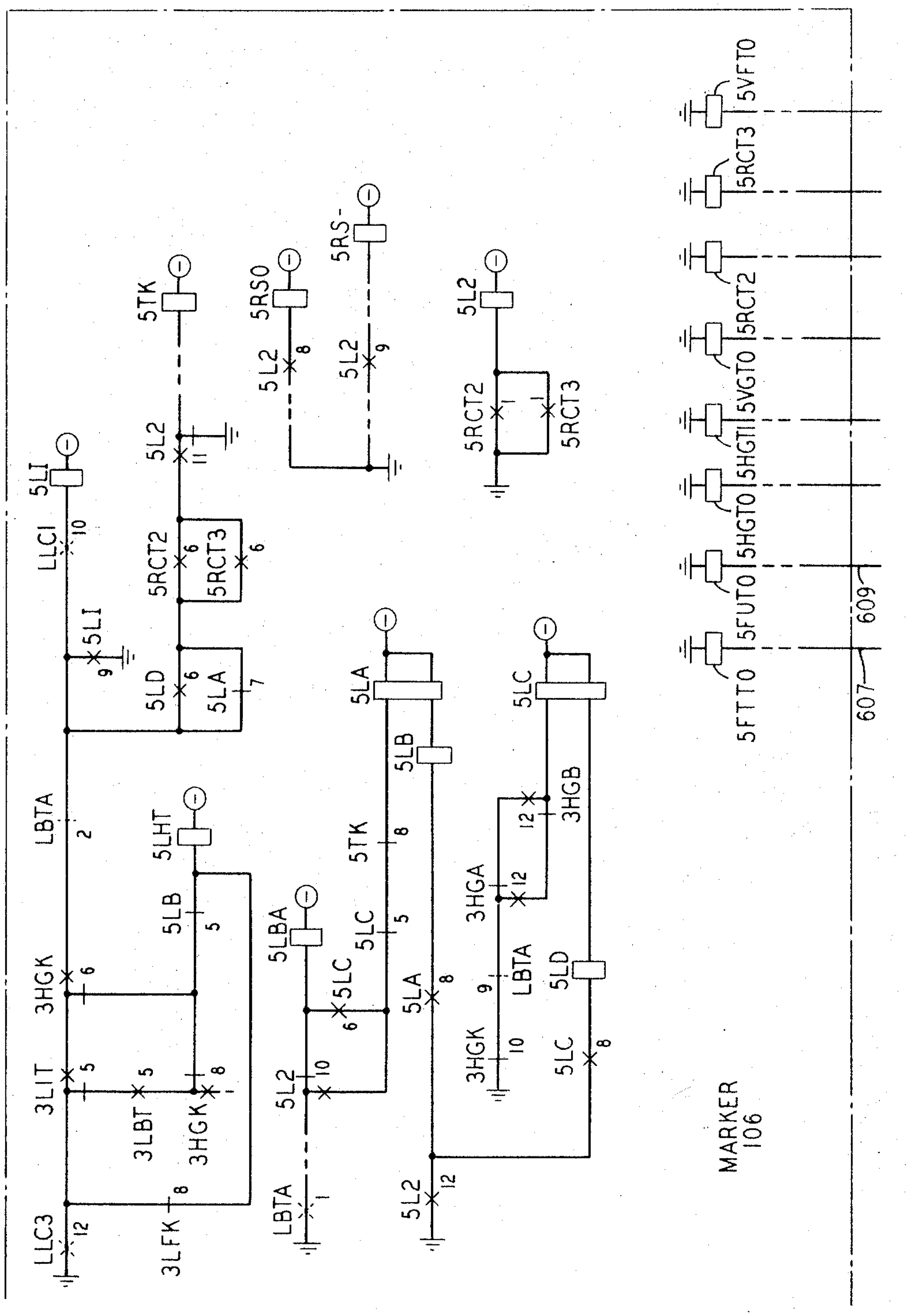
Figure 6:
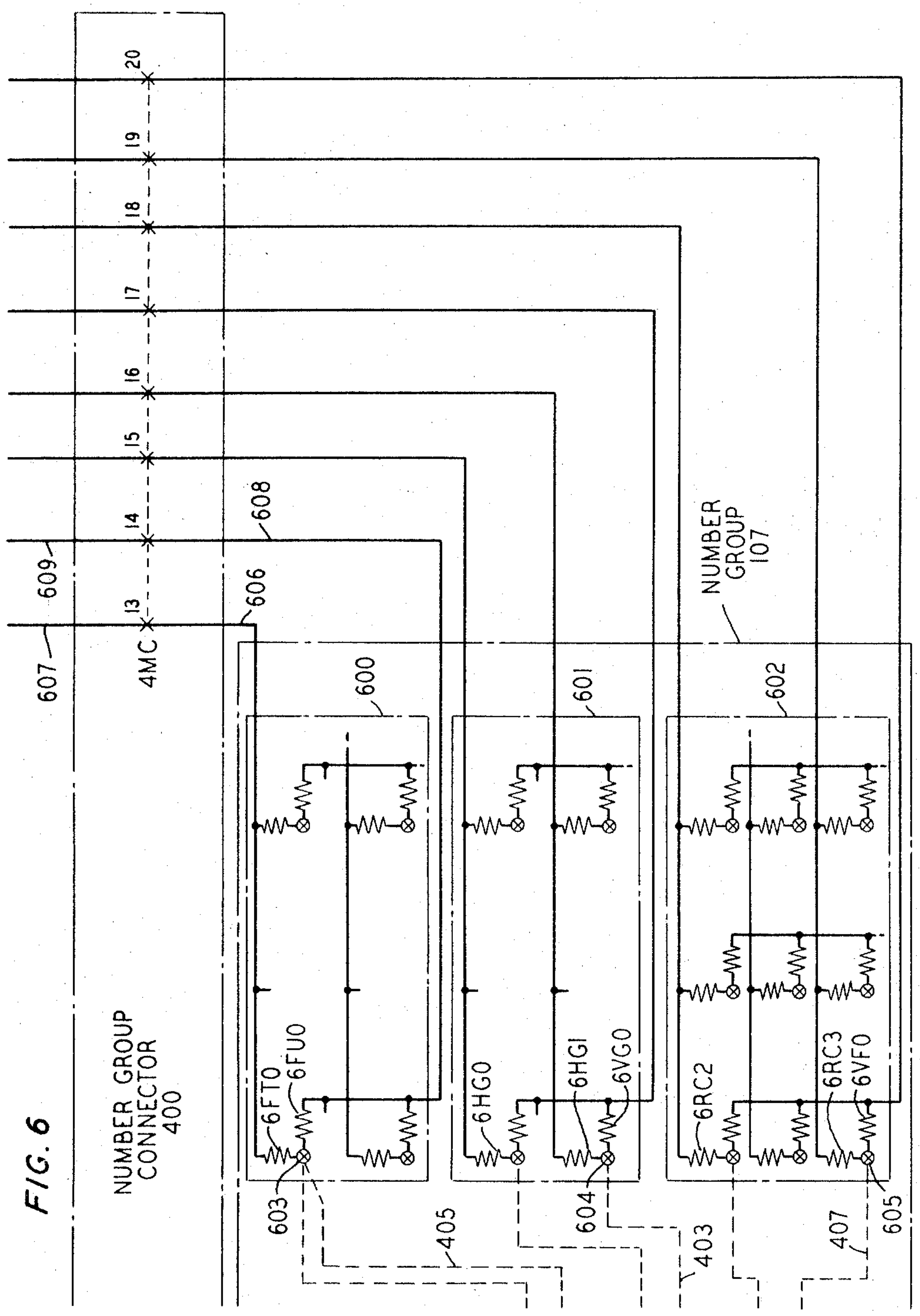

FIGS. 2–6 when arranged according to FIG. 7 depict, in more detail, portions of the system disclosed in the block diagram of FIG. 1. More specifically, FIG. 2 shows a portion of line link frame 100 and line link connector 200. FIGS. 3 and 5 show a portion of marker 106, and in particular, the circuitry used for line hunting. FIGS. 4 and 6 show portions of the number group translator circuit 107 and its associated connector 400.

Whenever possible the apparatus has been given a combined number and letter reference designation. The first number indicates the figure of the drawing in which the apparatus appears and the letters are abbreviations for the function of the apparatus. The contacts of relays are given the same reference designations as their windings followed by the contact number. The contacts which are shown dotted are the contacts of relays that are not shown herein but can be found in the aforementioned Busch disclosure.

For the purpose of describing the operation of this system it will be assumed that stations S1 and S2 have been assigned the directory numbers 555-2068 and 555-2468, respectively, and that these stations serve the same customer who desires to have the line hunting feature. As will be seen from the ensuing description, the stations can be assigned to any available directory number; however, to simplify the disclosure, the numbers have been selected in the same number group.

Let it be assumed that marker 106 is attempting to process an incoming call to station S1 and marker 106 has received the called directory number 2068 from an incoming register. The digits 2068 therefore would be registered on the thousands, hundreds, tens, and units relays in a called number register circuit 300 in the marker. Since this circuitry is well known in the prior art, only the contacts of these relays have been shown in FIG. 3 of the instant drawing.

With the called number registered in the marker, the marker is now ready to determine the line equipment location of the called line through the use of a number group translator circuit. Each number group is equipped to translate 1,000 directory numbers and by examining the thousands digit of the called directory number, the marker determines which number group to use. Thus, with the thousands relay TH2 operated, battery is extended through its make contacts TH2-1 in FIG. 3, over conductor 301 to FIG. 4, through apparatus not shown, and through the winding of marker preference relay 4MP2 to ground. If number group 107 is idle, marker preference relay 4MP2 operates and closes its contacts 4MP2-1 to complete an obvious operating circuit for multicontact connector relay 4MC. Relay 4MC, in operating, interconnects the marker 106 with number group 107 over a plurality of test and control conductors.

With the hundreds digit O registered in the marker, relays HN4 and HN7 is called number register 300 are operated and a path is extended from battery in FIG. 3, through make contacts HN4-1 and HN7-1, over conductor 302, through make contacts 4MC-1, through the winding of relay 4HB0 to ground to operate hundreds-block relay 4HB0 in the number group.

It will be recalled that the tens digit 6 had been stored in called number register 300 and with tens relays T4 and T2 operated a circuit is extended from battery in the marker, through make contacts T2-2 and T4-2, over conductor 303 to FIG. 4, through make contacts 4MC-8 and 4HB0-1 and through the winding of relay 4TB06 to ground thereby operating tens-block relay 4TB06.

The units register relays U7 and U1 are operated in called number register 300 and battery is extended through make contacts U1-1 and U7-2, over conductor 304, through make contacts 4MC-5 and the winding of units relay 4U8 to ground, operating relay 4U8 in number group 107.

Each number group circuit has 1000 sets of terminals, such as the L-, F-, and G- terminals shown in FIG. 4. With one units relay and one tens-block relay operated, one set of the terminals is marked by having battery supplied to them over conductors 305, 306, and 307 from the marker. Corresponding to the three terminals of each line set are three fields of translator terminals which are used for transmitting to the marker the location of the called line and the kind of ringing current required. If the line is in a hunting group, the number group also indicates how many lines are in the group and whether the marker should increment or decrement the line location information associated with the called line in order to find another line in the group.

The translator fields are shown in FIG. 6 and the first field 600 provides the identity of the line link frame on which the called line is located in terms of the tens and units of the frame number. The second field 601 identifies the line group in terms of the horizontal group of switches and the vertical group of switches on the line link frame within which the called line is located and the third field 602 provides the identity of the vertical file on which the line is located and the ringing current required on the line. Each translator field has as many terminals as there are combinations of items in that field and, as will be discussed below, the selection of a particular ringing combination will also forward to the marker the necessary information regarding line hunting.

Assuming that the called station S1, whose directory number is 2068, is connected over line L1 to the line hold magnet on line link frame 100 in vertical group 0, horizontal group 1 and vertical file 0, then the terminals L068, F068, and G068 would be connected to the field terminals 603, 604, and 605, respectively. The line link frame tens and units are then received from the number group in the following manner. Battery is extended through circuitry not shown in the marker (FIG. 3) over conductor 307 to FIG. 4, through make contacts 4MC-12 and 4U8-3, over conductor 404, through make contacts 4TB06-3 to terminal L068, over cross-connection 405 to terminal 603, through resistance 6FT0 and over conductor 606, through make contacts 4MC-13 and over conductor 607 to marker circuit 106, through equipment not shown in the marker circuit and through the winding of relay 5FTT0 to ground operating relay 5FTT0. This battery is also extended from terminal 603, through resistance 6FU0, over conductor 608, through make contacts 4MC-14, over conductor 609 and through the winding of relay 5FUT0 to ground operating relay 5FUT0. Relays 5FTT0 and 5FUT0 form that part of the line equipment location register which designates the tens and units of the line link frame on which the called line is located.

A similar circuit is completed for operating the horizontal group and vertical group register relays in the marker. This circuit can be traced from battery in the marker (FIG. 3) over conductor 306, through make contacts 4MC-11 and 4U8-2, over conductor 401, through make contacts 4TB06-2 and over conductor 402 to terminal F068. Terminal F068 is cross-connected to terminal 604 via cross-connection 403 to extend this battery through resistances 6HG1 and 6VG0 to operate the corresponding line location registration relays 5HGT1 and 5VGT0 in the marker in FIG. 5.

The circuit for operating the vertical file and ringing combination registration relays can be traced from battery in the marker in FIG. 3, over conductor 305 to FIG. 4, through make contacts 4MC-10, 4U8-1 and 4TB06-1 and over conductor 406 to terminal G068.

Terminal G068 is cross-connected to terminal 605 via cross-connection 407 and this completes the operating paths for relays 5RCT3 and 5VFT0 in FIG. 5 of the marker. Relay 5RCT3, in operating, completes an obvious path for operating two-line relay 5L2. Relay 5L2 informs the marker that the called number is in a line hunting group having two lines but the marker does not hunt at this time. Relay 5L2 at its make contacts 5L2-8 and 5L2-9 in FIG. 5 operates ringing selection relays 5RS0 and 5RS-. These ringing selection relays will subsequently cause the operation of a ringing selection switch associated with the trunk being used on the connection so that the appropriate ringing current will be transmitted to the called line.

The marker circuit has registered therein the line equipment location of the called line and can now proceed to seize the line equipment of the called line to ascertain if the line is busy before establishing a connection to the line. With the operation of relays 5FTT0 and 5FUT0, a path is closed in FIG. 3 for extending battery through make contacts 5FUT0-1 and 5FTT0-1, over conductor 308 to FIG. 2 and through the winding of marker preference relay 2MP to ground. If the line link frame 100 is available, relay 2MP operates to close its contacts 2MP1 and complete an obvious operating circuit for relay 2MCA. Relay 2MCA closes its make contacts 2MCA-9 to complete an obvious circuit for operating relay 3LFK in the marker thereby informing the marker that the line link frame has been seized. In addition, relay 2MCA extends a plurality of test and control leads between the line link frame and the marker so that the marker can function with the line link frame to select the called line. For example, battery is extended through marker equipment not shown and make contacts 5VGT0-1, over conductor 309, through make contacts 2MCA-1 and through the winding of vertical group select relay 2VGB0 to ground, thereby operating relay 2VGB0 on the line link frame. A similar path is completed from battery 316 in FIG. 3 through marker equipment not shown, through break contacts 5LA-5, 3HGA-11 and 3HGB-11, over conductor 315, through make contacts 5HGT1-3 and break contacts 3HGB-2 and 3HGA-2, over conductor 310, through contacts 2MCA-4 in FIG. 2 and through the winding of horizontal group select relay 2HG1 to ground. Relay 2HG1 operates in this circuit and closes its make contacts 2HG1-3 in FIG. 2 to extend ground through make contacts 2MCA-7 and over conductor 312 to operate relay 3HGK in the marker thereby indicating to the marker that the horizontal group relay has been operated on the line link frame. Relay 3HGK, in operating, closes its make contacts 3HGK-2 to extend battery from the marker over conductor 311 through make contacts 2MCA-6, 2VGB0-2, and 2HG1-2 and through the winding of line group relay 2LG1 to ground operating relay 2LG1.

Following the operation of the line group relay 2LG1 and with the vertical file test relay 5VFT0 operated, a circuit is completed for testing the busy-idle condition of the called line. This circuit can be traced from the bridging point between resistances R31 and R30 in FIG. 3, through the winding of relay 3LIT, through break contacts 5LI-7, through the winding of relay 3LBT, through break contacts HMS1-7 and LXP1-5, through make contacts 5VFT0-4, over conductor 314 and through make contacts 2MCA-8, over conductor 201, through make contacts 2LG1-1 and through the winding of line hold magnet 2LH10. It will be noted that both relays 3LBT and 3LIT are polarized relays and if the called line is idle, battery from the winding of line hold magnet 2LH10 will be extended back over the previously traced circuit to operate relay 3LIT. Relay 3LIT, in operating, signifies to the marker that the called line is idle and the marker will complete a connection to the called line in a normal manner.

To demonstrate how the line hunting feature works, let it be assumed that station S1 is busy and that line hold magnet 2LH10 is operated thereby connecting station S1 to a network channel. With line hold magnet 2LH10 operated ground is extended from the sleeve conductor of the busy connection over the previously traced path to operate line busy test relay 3LBT in the marker.

In operating, relay 3LBT operates relay LBTA (not shown) and relay LBTA closes its make contacts LBTA-1 in FIG. 5 to extend ground through marker equipment not shown, through make contacts 5L2-10, through break contacts 5LC-5 and 5TK-8 and through the upper winding of relay 5LA to battery thereby operating relay 5LA. At its break contacts 5LA-5 in FIG. 3, relay 5LA interrupts the operating circuit for horizontal group select relay 2HG1 on line link frame 100 and relay 2HG1 releases releasing relay 3HGK in the marker and line group relay 2LG1 on the line link frame. The release of line group relay 2LG1 releases the line busy test relay 3LBT in the marker. With the horizontal group and line group relays released on the line link frame, the marker has disconnected its busy test lead from the line hold magnet 2LH10 associated with line L1 and the marker is now prepared to advance to another line in the hunting group.

As set forth above, the marker receives the line equipment location number from the number group circuit 107 and stores this number in a register while using the information for seizing control of the called line. In accordance with one feature of the invention, the marker also receives an indication as to how the called line equipment register can be changed to indicate another line in the hunting group in the event that the called line is found busy. In the illustrative embodiment of the invention, the line location is designated in terms of its line link frame, vertical group, horizontal group, and vertical file identities and it is advantageous to alter the horizontal group identity to ascertain the line location of the second line in the group. In the particular system embodying the invention, altering only the horizontal group designation permits the marker to maintain control over the same line link frame originally selected. The selection of a new horizontal group will permit the selection of a different group of network channels. Of course, it will be obvious to those skilled in the art that any of the other line location identities can be altered within the spirit and scope of the invention.

It will be recalled that the number group translator indicated to the marker that the called number required the ringing combination designated by relay 5RCT3. Relay 5RCT3 also indicated to the marker that the called line is in a two-line hunting group and to find the second line, the marker must subtract one from the horizontal group number of the originally called station.

When relay 5LA operated as a result of finding line L1 busy, a path was completed from battery through the lower winding of relay 5LA, through the winding of relay 5LB and through make contacts 5LA-8 and 5L2-12 to ground operating relay 5LB and maintaining relay 5LA operated. Relay 5LB closes its make contacts 5LB-8 in FIG. 3 to extend ground through make contacts 5RCT3-10 and through the winding of relay 3HGB to battery, operating relay 3HGB. A circuit is now completed for operating relay 5LC. The circuit includes battery through the upper winding of relay 5LC, through make contacts 3HGB-12 through break contacts 3HGA-12, LBTA-9 and 3HGK-10 to ground. Relay 5LC, in operating, locks over a circuit including battery through its lower winding, through its winding of relay 5LD, and through make contacts 5LC-8 and 5L2-12 to ground. The locking circuit for relay 5LC also operates relay 5LD and prepares the marker for selecting the horizontal group associated with line S2.

Prior to the operation of relay 3HGB, the contacts of relays 5HGT- were connected to corresponding output conductors to operate a similarly numbered horizontal group select relays on the line link frame. When relay 3HGB operates, however, the contacts of these relays are transferred to lower numbered output conductors causing the next lower numbered horizontal group select relay to operate. For example, with both relays 5LD and 5LA operated, a circuit is completed from battery in FIG. 3 through marker equipment not shown, through make contacts 5LA-6, 5LD-6, 5HGT1-3 and 3HGB-2, through break contacts 3HGA-1, over conductor 313, through make contacts 2MCA-5 and the winding of relay 2HG0 to ground. Relay 2HG0 operates over this path and completes the previously traced path for operating relay 3HGK in the marker. With relay 3HGK operated in the marker a circuit is once again completed for operating a line group relay. In this case, line group relay 2LG0 is operated from ground through its winding, through make contacts 2HG0-2 and over the previously traced path to battery in the marker.

Having operated line group relay 2LG0 on the line link frame, the previously traced busy test lead in the marker is now extended from make contacts 2MCA-8 over conductor 201 and through make contacts 2LG0-1 to the winding of line hold magnet 2LH00. Assuming that line L2 is idle, the battery from line hold magnet 2LH00 will operate line idle test relay 3LIT in the marker. With relay 3LIT operated, ground is extended through make contacts LLC3-12 in FIG. 5, through make contacts 3LIT-5 and 3HGK-6, through break contacts LBTA-2, through make contacts LLC1-10 and the winding of relay 5LI to battery to operate line idle relay 5LI. This ground is also extended through make contacts 5LD-6, 5RCT3-6, and 5L2-11 and through equipment not shown and the winding of relay 5TK to battery. As set forth in the Busch disclosure when total check relay 5TK operates, the marker can proceed to select an idle channel between the incoming trunk and the called line and once the channel has been established the marker can disconnect.

When the marker was initially seized, a plurality of relays such as LLC3 operated in the marker to prepare the marker for subsequent operation. In FIG. 5, relay LLC3 closes its make contacts LLC3-12 to complete a path through break contacts 3LFK-8 and through the winding of relay 5LHT to battery operating relay 5LHT. Relay 5LHT will normally release upon the satisfactory seizure of a line link frame as indicated by the operation of relay 3LFK and the opening of contacts 3LFK-8 in FIG. 5. Should there be a false battery or ground potential on busy test conductor 314, either relay 3LBT or 3LIT will operate prior to the operation of horizontal group check relay 3HGK. The operation of either one of these relays will complete a path in FIG. 5 for reoperating relay 5LHT indicating to the marker that there is a trouble condition on busy test conductor 314. During line hunting operation, however, the horizontal group check relay 3HGK may release before line busy test relay 3LBT releases, and to prevent the false operation of relay 5LHT under these circumstances, contacts 2LB-5 interrupts this path.

In the foregoing example the call was initially directed to line L1 which is identified by the directory number 555-2068. Finding line L1 busy, the marker used the ringing combination information from the number group to operate relay 3HGB to change the horizontal group designation to a new designation which is one less than the desination received from the number group. Using the new designation, the marker was able to complete the call to line L2 which is identified by the directory number 555-2468. Had the call been initially directed to line L2 and L2 as found busy, the marker would have added one to the horizontal group designation through the operation of relay 3HGA thereby ascertaining the horizontal group designation of line L1.

It is to be understood that the above-described arrangements are merely illustrative of the application of the principles of the invention. Numerous other arrangements may be devised by those skilled in the art without departing from the spirit and scope of the invention. For example, while only the horizontal group designation has been changed in the disclosed embodiment it would be obvious to those skilled in the art that any of the other line location designations can be changed individually or in combinations in order to accomplish line hunting.

In addition, the change of designation need not be limited to the addition or subtraction of one but can be any number and the change can be made repeatedly if the hunting group includes more than two lines.

Furthermore, the manner in which the line location designation is altered need not be limited to the changing of the output of the line location register but the register, itself, may be incremented or decremented.

It should be noted that the line hunting feature heed not be limited to situations wherein a line busy condition has been encountered. For example, the marker may be arranged to hunt if the called line is out of service, such as in a line lock-out mode, or if the marker is unable to select an idle channel to the called line. In the latter case the selection of another line in the hunting group might give access to different channels thereby improving the so-called "matching loss".

It should also be pointed out that the proposed arrangement can be arranged so that hunting will be accomplished from many lines to a single common line. This service may advantageously be provided where a receptionist has the duty of answering calls which overflow from a plurality of individual lines when the individual lines are busy.

What is claimed is:

1. In a telephone system, a plurality of lines arranged in hunting groups wherein each line is assigned a directory number and a line equipment number, connecting means for establishing connections to said lines as determined by said equipment numbers, translating means responsive to a directory number associated with a first one of said lines for concurrently translating said first line directory number into a line equipment number associated with said first line and into an indication of the line equipment number of a second one of said lines in the same hunting group as said first line, and control means independent of said translating means and responsive to the unavailability of said first line for changing said first line equipment number in accordance with said indication to enable said connecting means to establish a connection to said second line.

2. The invention defined in claim 1 wherein said control means includes means responsive to said translating means for indicating the number of lines in the same hunting group as said first line.

3. In a telephone system, a plurality of lines arranged in hunting groups wherein each line is assigned a directory number and a line equipment number comprising a plurality of equipment designations, connecting means for establishing connections to said lines as determined by said equipment numbers, translating means responsive to a directory number associated with a first one of said lines for concurrently translating said first line direction number into a line equipment number associated with said first line and into an indication of the line equipment number of a second one of said lines in the same hunting group as said first line, and control means responsive to the unavailability of said first line for altering at least one designation of said first line equipment number to form a second line equipment number associated with said second line to enable said connecting means to establish a connection to said second line.

4. The invention defined in claim 3 wherein said control means also comprises means responsive to said translating means for registering the equipment designations corresponding to said first line directory number and means for actuating said register means in accordance with said indication.

5. The invention defined in claim 4 wherein said register means includes output means for causing said connecting means to establish a connection to said first line and wherein said actuating means comprises means for changing said output means to cause said connecting means to establish a connection to said second line.

6. The invention defined in claim 4 wherein said register means comprises a plurality of individual registers each for storing one of the equipment desinations of said first line equipment number and wherein said actuating means comprises means for altering the output of at least one of said registers.

7. In a telephone system, a plurality of line equipments each designated by a distinct line equipment number, a plurality of lines each assigned a distinct directory number and each connected to one of said line equipments, the assignment of directory numbers to said lines being independent of the assignment of line equipment to said lines, control means for establishing communication paths to said lines as determined by said line equipment numbers, translator means actuated in response to the receipt of a called directory number for a first one of said lines for informing the control means of the number of the line equipment connected to said first line and an indication of the number of the line equipment connected to another of said lines, and means independent of said translator and responsive to the availability of said first line for selecting one of said first and second lines for connection.

8. In a telephone system having a plurality of line frames each comprising groups of line units wherein each said line unit is assigned a directory number independent of its line unit number, a line hunting arrangement comprising the combination of means responsive to a called directory number assigned to a first one of said line units for translating said called directory number into a line frame designation and a line group designation representing the first line unit number and into a special designation representing another line unit, first selecting means actuated in response to said line frame designation for seizing control of the line frame of said first line unit, second selecting means enabled in response to said line group designation for seizing control of the line group of said first line unit, means responsive to the unavailability of said first line unit for disabling said second selecting means while maintaining said first selection means actuated and means responsive to said special designation for enabling said second selecting means to seize control of the line group of said other line unit.

9. The invention defined in claim 8 wherein said second selecting means comprises a first plurality of registers each corresponding to a different line group designation, a plurality of output conductors each corresponding to a different line group, and circuit means for selectively interconnecting each of said register means with a different one of said output conductors.

10. The invention defined in claim 9 wherein said circuit means comprises means responsive to said enabling means for rearranging the interconnection of said registers with said output conductors.

11. In a telephone system having a switching network and a plurality of lines connected to the network and each assigned a line directory number and a line equipment number and wherein certain of said lines are arranged in line hunting groups, the combination comprising translation means responsive to a line directory number of a called line for providing a corresponding line equipment number, said line equipment number comprising a plurality of individual equipment designations, said translation means further including means for providing an indication that a line is in a line hunting group, register means for storing said individual line equipment designations and said line hunting group indication, means responsive to said stored individual line equipment designations for operating the switching network to effectuate a connection to said called line, and means responsive to the unavailability of said called line and said stored line hunting group indication for rearranging said operating means with respect to one of said stored individual line equipment designations to cause said switching network to effectuate a connection to another line in the hunting group for said called line.

12. In a telephone system, the combination in accordance with claim 11 wherein said rearranging means includes means for incrementing and means for decrementing said one stored individual line equipment designation and said register means includes means for storing an indication determining the operation of one of said incrementing and decrementing means in said rearranging means.

13. In a telephone system, the combination in accordance with claim 12 wherein said switching network comprises crossbar switches, wherein said individual stored line equipment designations include line link frame, vertical group, horizontal group, and vertical file designations, wherein said means in said register means for storing an indication determining the operation of said incrementing and decrementing means includes relays, and wherein said incrementing and decrementing means in said rearranging means include contacts of said relays, said contacts rearranging connections in said operating means for said horizontal group designations.

* * * * *